United States Patent [19]

Després

[11] Patent Number: 4,574,932
[45] Date of Patent: Mar. 11, 1986

[54] TORSION DAMPING ASSEMBLY FOR AUTOMOTIVE CLUTCHES

[75] Inventor: Dominique Després, Clichy, France

[73] Assignee: Valeo, Paris, France

[21] Appl. No.: 474,828

[22] Filed: Mar. 14, 1983

[30] Foreign Application Priority Data

Mar. 26, 1982 [FR] France ............................... 82 05184

[51] Int. Cl.⁴ .............................................. F16D 3/14
[52] U.S. Cl. ............................. 192/106.2; 192/106.1; 464/68
[58] Field of Search ............... 192/106.1, 106.2, 70.17; 464/64, 66, 68

[56] References Cited

U.S. PATENT DOCUMENTS

| | | | |
|---|---|---|---|
| 3,863,747 | 2/1975 | Werner et al. | 192/106.2 |
| 4,018,320 | 4/1977 | Schrape et al. | 192/106.2 |
| 4,222,475 | 9/1980 | Fénart | 192/106.2 |
| 4,222,476 | 9/1980 | LeBrise | 192/106.2 |
| 4,352,420 | 10/1982 | Maycock | 192/106.2 |
| 4,354,586 | 10/1982 | Stanley | 192/106.2 |
| 4,474,276 | 10/1984 | Loizeau | 192/106.1 |

FOREIGN PATENT DOCUMENTS

| | | | |
|---|---|---|---|
| 2907045 | 8/1979 | Fed. Rep. of Germany | 192/106.2 |
| 1485244 | 6/1967 | France . | |
| 2361577 | 3/1978 | France . | |
| 2365728 | 4/1978 | France . | |
| 2390617 | 12/1978 | France . | |
| 2446960 | 8/1980 | France . | |
| 2370902 | 1/1981 | France . | |
| 1094762 | 12/1967 | United Kingdom | 192/106.2 |

Primary Examiner—Rodney H. Bonck
Assistant Examiner—Richard M. Lorence
Attorney, Agent, or Firm—Charles E. Brown; Charles A. Brown

[57] ABSTRACT

A torsion damping assembly comprises two coaxial parts mounted for relative angular rotation preferably including a hub web and a pair of annular guide members. Coil springs are chordally interposed between the coaxial parts. A friction washer is in axial contact with an axial load bearing component formed by one of the guide members or the hub web. An axially acting spring washer bears against the bearing component on the side of the bearing component remote from the friction washer and urges the friction washer toward the bearing component. The spring washer is axially interconnected with and detented to the retaining washer located on the other side of the bearing component. Preferably the retaining washer has resiliently deformable axial tabs which deflect for interconnecting the spring washer with the retaining washer. The retaining washer may be formed as a one-piece molded plastic part with the axial tabs. The spring washer is preferably disposed axially outside the guide washers for facilitating assembly.

21 Claims, 17 Drawing Figures

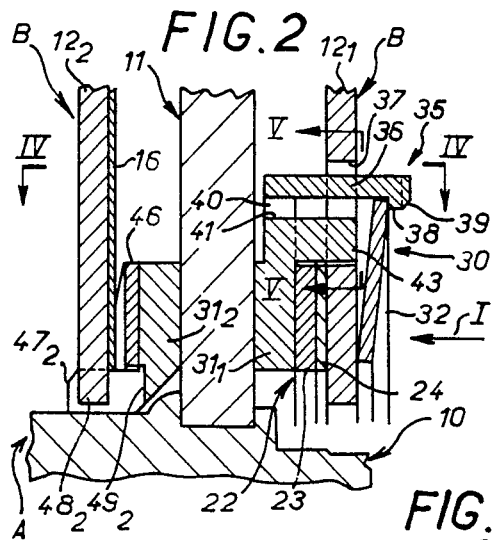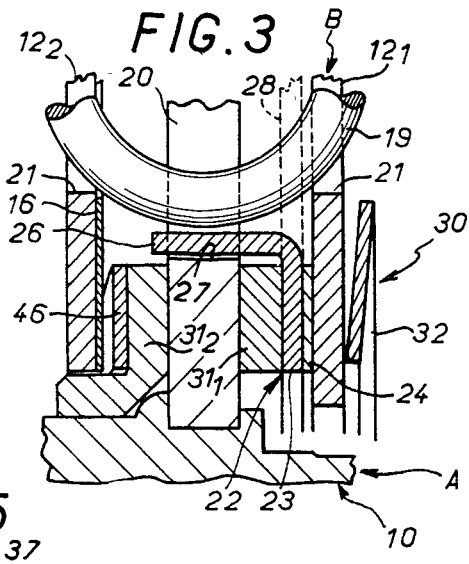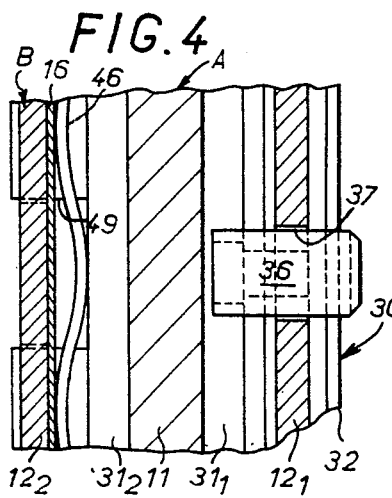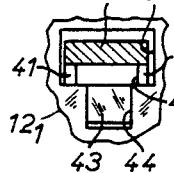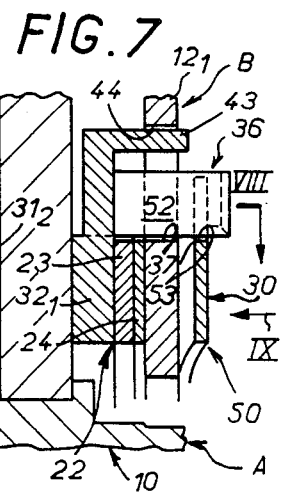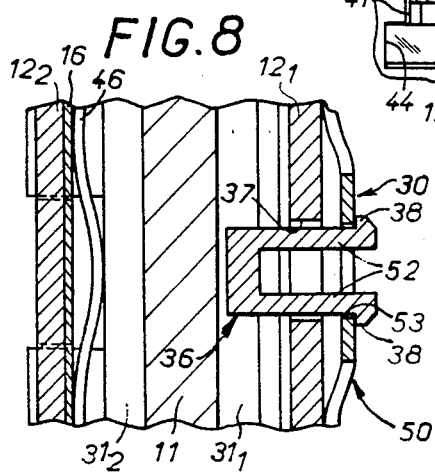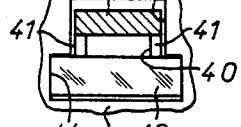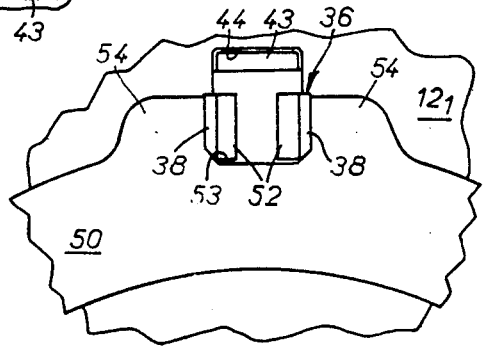

TORSION DAMPING ASSEMBLY FOR AUTOMOTIVE CLUTCHES

BACKGROUND OF THE INVENTION

The present invention relates generally to torsion damping assemblies comprising two coaxial parts mounted for relative angular displacement within a predetermined range against the action of resilient means interposed chordally between the coaxial parts.

As is known such torsion damping assemblies usually comprise part of a friction clutch in particular for motor vehicles. One of the coaxial parts then comprises a friction disc adapted to be fixed for rotation with a first shaft, in practice the driving shaft, the output shaft of the engine in the case of a motor vehicle, and the other coaxial part is carried by a hub adapted to be fixed for rotation with a second shaft, in practice a driven shaft, which is the transmission input shaft in the case of a motor vehicle.

Such a torsion damping assembly provides regulated transmission of the rotational torque applied to one of the coaxial parts while rotational torque is also imparted to the other coaxial part. In other words the torsion damping assembly filters vibrations which may be generated somewhere along the kinematic chain or drive line running from the engine to the axles in the case of a motor vehicle.

One of the coaxial parts of such a torsion damping assembly usually comprises a transverse web or flange, in practice a hub web, and the other comprises at least one annular guide member or washer, and in practice two such annular guide members or washers arranged on opposite sides of the hub web and connected to each other by rivets or cross members, the associated resilient means being disposed in housings formed partly in the hub web and partly in the guide washers. Friction means are usually axially interposed between the coaxial parts for introducing a hysteresis effect in the operating characteristics of the torsion damping assembly, i.e., a difference between the torque transmitted from one coaxial part to the other for an increasing relative angular displacement of a given value compared to a decreasing relative angular displacement of the same value.

In French patent publication No. 2,370,902, an arrangement was proposed wherein a friction washer was disposed in axial contact with a guide member or a component fixed thereto, on the side of the guide member facing the hub web, and urged toward the guide member by axially acting resilient clamping means which bear axially against the same guide member or component fixed thereto. There is a sort of clamping action exerted between the guide member and the axially acting resilient clamping means.

Such an arrangement has the advantage that the axially acting resilient clamping means operate on a single friction washer and are therefore operative insofar as the friction washer is operative by rotation relative to the corresponding guide member, for example, by axial lugs on the hub web, or by radial fingers on at least one of the resilient means interposed chordally between the coaxial parts, without affecting other friction means which may be provided between the coaxial parts of the torsion damping assembly.

In the above French patent publication the axially acting resilient clamping means which are individually associated with a friction washer bear axially against the rivets or cross members interconnecting the guide members.

Although such an arrangement has been found to be satisfactory it has various drawbacks. First of all, the assembly of the guide members must be carried out in two steps: in a first step a subassembly is formed by the cross members, comprising one guide member, one friction washer and the axially acting resilient clamping means associated therewith, and in a second step, after the cross members are passed through the hub web, the cross members are assembled to the other guide members.

Now, in practice, the preliminary assembly of the subassembly in the first step is rather delicate operation partly because the assembly operation requires handling the cross members which subsequently connect the guide members to each other. It is important not to damage the free end of the connecting members so that the securement of the second guide member on the cross members may be carried out under good conditions. This has meant protective caps must be provided at the free ends of the cross members which requires additional handling operations.

This preliminary assembly of the subassembly is also rather delicate because it involves the presence of the resilient clamping means inside the space defined between the guide members and therefore the resilient clamping means must be compressed.

Further, the resilient clamping means increases the axial dimension of the subassembly, the cross members may not be standard components which are provided only for connecting guide members with the clamping of the friction disc usually associated therewith.

It may be impossible to add to a conventional torsion damping assembly the arrangement of friction washer and the particular axially acting resilient clamping means just mentioned.

Finally, since the axially acting resilient clamping means are in practice radially extending leaf spring members, another difficulty may arise owing to the possible interference between the leaf spring members and the axial lugs which may be necessary for the indexing on the hub web of the associated friction washer during relative angular displacement between the coaxial parts of the torsion damping assembly.

In French Pat. No. 1,485,244 there is provided in contact with the side of the guide member directed toward the hub web, a friction washer having special axially acting resilient clamping means and it is disposed on the other side of the guide member, i.e., on the side thereof remote from the hub web, and therefore outside the space defined by the two guide members.

The assembly of the guide members is facilitated since it does not involve the compression of the axially acting resilient clamping means, which are mounted subsequently. But it is then necessary to provide on the side of the guide member facing the hub web a special washer called a retaining washer and to interconnect it by attaching means with the axially acting resilient clamping means associated with the friction washer.

In French Pat. No. 1,485,244 the attaching means comprise a nut which is threadedly engaged with a hollow threaded fastener fixed on the retaining washer, the axially acting resilient clamping means bearing against the nut.

This arrangement has a number of drawbacks. First of all, the hollow threaded fastener is of complex construction and has a screwthread which is relatively expensive to cut. Further, the nut and threaded fastener together are of a not insubstantial axial dimension for the overall assembly. Finally, when, as is most often the case, the unit defined by the friction washer and the particular axially acting resilient clamping means is located on the side of the torsion damping assembly facing the clutch cover assembly associated therewith, there are problems to locate the unit owing to the possible interference between the nut which has a substantial radial dimension and against which the axially acting resilient clamping means bear and on the other hand the clutch release mechanism of the cover assembly which is defined by the radial fingers of a diaphragm spring.

SUMMARY OF THE INVENTION

A general object of the invention is to overcome the various drawbacks of the prior art briefly described above.

According to the invention there is provided torsion damping assembly for an automotive friction clutch, which comprises at least two coaxial parts mounted for relative angular displacement within a predetermined range, resilient means interposed chordally between said coaxial parts. Friction washer means are arranged in axial contact with a bearing component formed by one of the coaxial parts. Axially acting resilient clamping means bear against the bearing component on one side thereof remote from said friction washer, urging said friction washer means toward the bearing component. Detent means axially interconnect the resilient clamping means with a retaining washer located on the other side of the bearing component.

One of the coaxial parts comprises a web and the other comprises at least one, and in practice two, annular guide members disposed on the respective sides of and spaced from the web, and therefore the bearing component may be defined by one of the guides members or a part fixed thereto, or a web or a part fixed thereto.

In the first case, owing to the arrangement according to the invention, the resilient clamping means associated with the corresponding friction washer may be advantageously disposed outside the space defined by the guide washers, and in the second case the resilient clamping means may be disposed inside the space defined by the guide members. Nevertheless in both cases the resilient clamping means are not mounted at the same time the guide members are assembled.

Further, since the resilient clamping means do not bear against the cross members provided for connecting the guide members together, the cross members may advantageously be conventional cross members.

Moreover, when the resilient clamping means are disposed outside the space defined between the guide members there is no possible interference due to any axial lugs on the friction washer necessary for indexing it on the web during relative angular displacement of the coaxial parts of the torsion damping assembly.

Furthermore, there is no possible interference between the diaphragm spring of the associated cover assembly since the detent means according to the invention are relatively small and compact and in addition may be disposed at a sufficiently great distance from the axis of the assembly to avoid, with all due security, any such interference. In particular, when the resilient clamping means comprises a spring washer disposed annularly around the axis of the assembly, for example, a Belleville washer, the spring washer may open or diverge to the side away from the associated guide member thereby reducing the likelihood of interference between the diaphragm spring of the cover assembly while being better oriented with respect to the conical configuration of the diaphragm spring during clutch operation. In contrast, in the arrangement disclosed in French Pat. No. 1,485,244, discussed above, the resilient washer must necessarily open or diverge toward the guide member.

According to a preferred embodiment of the invention the detent means comprise at least one axially extending resiliently deformable tab fixed to a selected one of the retaining washer and the resilient washer and in engagement with the nonselected one of the retaining washer and the resilient washer.

Preferably, and although there are other possible arrangements, the resilient deformable tab is in one-piece construction with the retaining washer and it is formed of plastic material, the retaining washer defining a spacer washer between the web and the friction washer. There advantageously results a plastic/metal frictional contact between the retaining washer and the web which is favorable to the sought-after hysteresis effect.

In addition, since the plastic material is relatively light it is advantageously possible, without substantially increasing the inertia of the assembly, to provide the resilient tab at a relatively large radial distance from the axis and in any event sufficient far to avoid, as mentioned above, any interference with the diaphragm spring of the clutch cover assembly associated with the torsion damping assembly.

Thus, according to the invention there may be provided a retaining washer of plastic material having resiliently deformable axial tabs. In practice, for engagement with the associated resilient clamping means, the resiliently deformable axis tabs extend through passages in the associated bearing component. The tabs may, if desired, define means for connecting the retaining washer for rotation with the bearing component. In this event, the prejudice those skilled in the art have against the use of tabs of plastic material is overcome which heretofore precluded the adoption of such tabs extending through a guide member or web, since a certain amount of hammer hardening had been observed on metal tabs or lugs.

Alternatively, for fixing the retaining washer for rotation with the bearing component, one or more nibs or dogs or other similar means may be provided on the retaining washer separate from the resiliently deformable axial tabs.

Finally, when the resilient clamping means are arranged outside the space defined between the guide members, the resilient means are assembled by snapping or detent action after the assembly of the guide members, it is therefore possible to provide, if desired, depending of the particular application, a special friction washer device which is subjected to the resilient clamping means. A great degree of versatility results.

The features and advantages of the invention will become more apparent from the description which follows, given by way of example, with reference to the accompanying diagrammatic drawings.

BRIEF DESCRIPTION OF THE DRAWINGS

FIGS. 2 and 3 show an enlarged scale fragmentary views in longitudinal section, taken respectively along lines II—II and III—III in FIG. 1;

FIG. 4 shows a flattened fragmentary circumferential sectional view taken along line IV—IV in FIG. 2;

FIG. 5 shows a fragmentary transverse sectional view taken along line V—V in FIG. 2;

FIG. 6 shows a view similar to that of FIG. 5 for an alternative embodiment;

FIGS. 7 and 8 are respectively similar to FIGS. 2 and 4 for another alternative embodiments;

FIG. 9 shows a fragmentary elevational view taken in the direction of arrow IX in FIG. 7;

DESCRIPTION OF THE PREFERRED EMBODIMENTS

Figure 1:
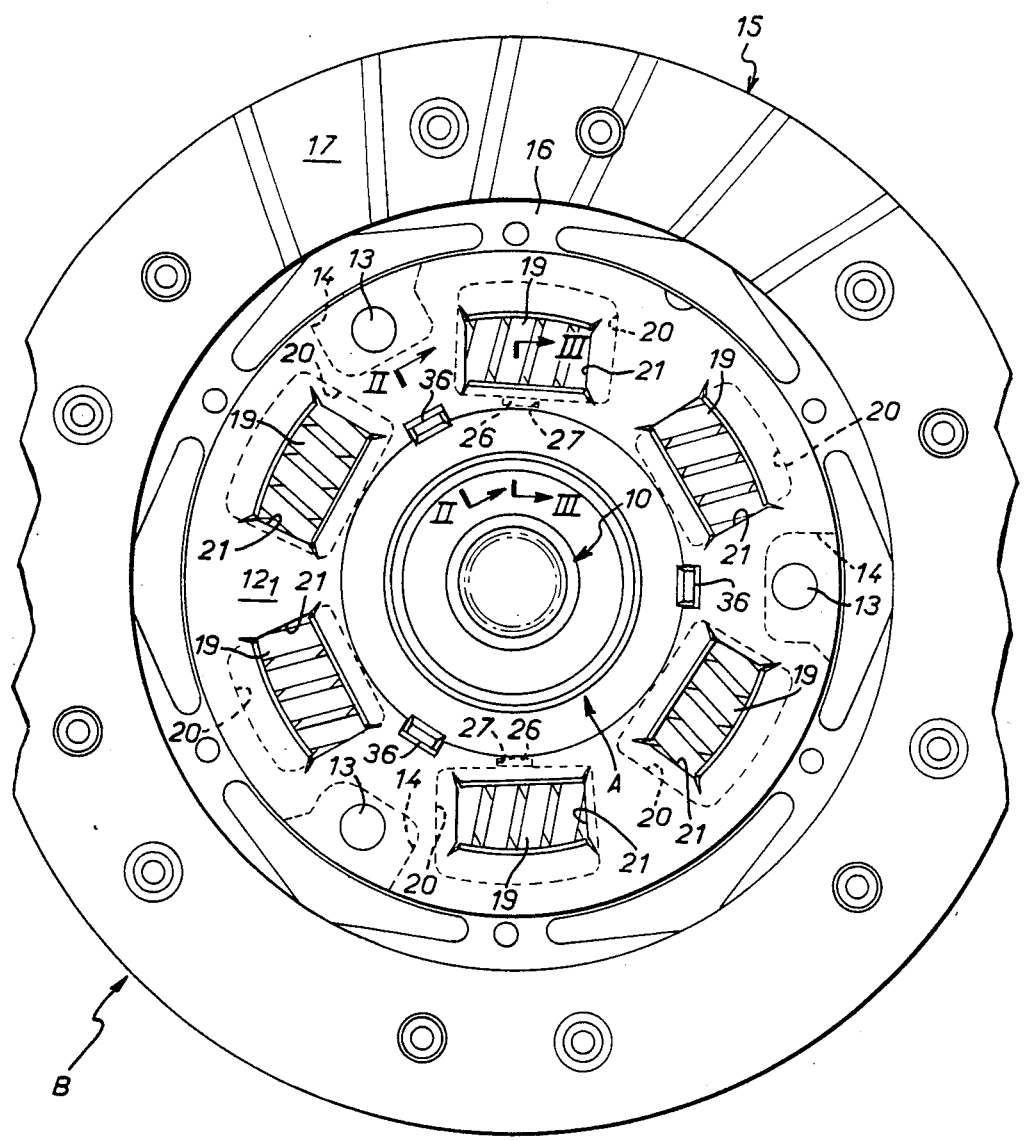
FIG. 1 shows a partial elevational view of a torsion damping assembly, taken in the direction of arrow I in FIG. 2.

In the preferred embodiment shown in the drawings, the invention is illustrated in an automotive or motor vehicle friction clutch, the torsion damping assembly according to the invention comprises two coaxial parts A, B mounted for relative angular displacement within a predetermined range.

Coaxial part A which is the output part comprises, in the illustrated embodiments, a hub 10 which is internally splined for rotation with a first or driven shaft which is the transmission input shaft in the case of a motor vehicle. Coaxial part A further comprises a transverse web or flange 11 called a hub web which in illustrated embodiments is fixed for rotation with the hub 10 and is, for example, secured thereto by swaging in the middle of the hub 10 as shown.

Generally speaking, the coaxial part B which is the input part comprises at least one annular guide plate or member 12 transverse and parallel to the hub web 11. In the illustrated embodiments the coaxial part B comprises two annular guide members $12_1$, $12_2$ which are disposed on respective sides of and spaced from the hub web 11. The annular guide members $12_1$, $12_2$ are connected to each other by cross members 13 extending with clearance through notches 14 formed in the periphery of the hub web 11.

In the illustrated embodiments the cross members 13 are pins, that is to say they are of circular cross section, and three in number, and regularly angularly spaced from one another. Alternatively, the cross members may be flat, that is, of generally rectangular cross section.

Coaxial part B further comprises a friction disc 15 having a plate 16 which, optionally, is divided into cushion springs and which lies against the annular guide member $12_2$ and is fixed thereto by the cross members 13 which also secure annular guide member $12_1$ to annular guide member $12_2$. The friction facings 17 are disposed annularly along the outer peripheral area of the plate 16. By means of the friction facings the coaxial part B is adapted to be fixed for rotation with a second or driving shaft which is the engine output shaft in the case of a motor vehicle, the friction facings 17 being clamped or squeezed between two plates fixed for rotation with the output shaft.

Between the coaxial parts A and B thus constructed are interposed chordally acting resilient means. In the illustrated embodiments the resilient means comprise six coil springs 19 which are disposed substantially chordally of the assembly. Each of the springs 19 is housed in part in a window 20 formed in the hub web 11 and in part in corresponding windows 21 in the annular guide members $12_1$, $12_2$.

According to arrangements which are well known in the art and are not per se part of the present invention and therefore need not be described in great detail, springs 19 are arranged in a plurality of groups adapted to come into action at predetermined points in the course of relative angular displacement of the coaxial parts A, B. Variable circumferential play is provided between the windows 20 in the hub web 11 in which the springs 19 are accommodated and the corresponding windows 21 in the annular guide members $12_1$, $12_2$, except for the spring or springs 19 which are to come into action first.

Friction means are interposed between the coaxial parts A and B. These friction means may comprise a friction washer means 22 disposed axially in contact with a component which is part of one of the coaxial parts A and B and will be referred to as an axial load bearing component or simply a bearing component. In the illustrated embodiments of FIGS. 1–16, the bearing component comprises one of the guide members $12_1$ or a component fixed thereto on the side of the guide member facing toward the hub web 11.

The term friction washer means as used herein is intended to cover either a single friction washer or a friction washer assembly comprising a back-up of support washer 23, in general of metal, and a friction facing 24 which is made of a friction material and is secured to the support washer 23 by bonding or, more simply, freely arranged with respect to the support washer 23. Thus the friction washer means 22 are in contact through friction facing 24 with the guide member $12_1$ and therefore the coaxial part B and are freely annularly slidable about the axis of the assembly although the friction washer means have indexing means for indexing on coaxial part A to develop relative angular movement between the friction washer means 22 and coaxial part B.

In the solid lines in the embodiment of FIG. 3, the back-up or support washer 23 comprises, at its periphery at least one axial tab 26 and in practice two tabs 26 substantially diametrically opposite each other. Each of the tabs 26 is received, optionally with circumferential clearance to either side, in a cutout 27 in the hub web 11. The cutout 27 may be a notch provided along the edge of one of the windows 20 in the hub web 11 for housing springs 19.

Alternatively, in broken lines in FIG. 3, for the desired indexing of the friction washer means 22 on coaxial part A, the support washer 23 may, for example, comprise at least one finger 28 adapted to cooperate with one of the circumferential ends of a spring 19 in the course of relative angular displacement of coaxial parts A, B. Such arrangements are well known per se and need not be described in greater detail herein.

Likewise, as is known per se, the friction washer 22 is urged toward the associated bearing component, here guide member $12_1$, by means of axially acting resilient clamping means 30. The resilient clamping means 30 bear against the bearing component and therefore against the guide member $12_1$ on the side thereof opposite the friction washer 22 and therefore outside the space defined between guide members $12_1$ and $12_2$ in the embodiments illustrated in FIGS. 1-16. The resilient clamping means 30 are interconnected with a retaining washer $31_1$ by means described below. The retaining washer $31_1$ is disposed on the same side of the bearing component as the friction washer 22 and therefore on the side of the guide member $12_1$ facing the hub web 11, between the latter and the friction washer 22 in the embodiments of FIGS. 1-16.

In the embodiments of FIGS. 1-5, the axially acting resilient clamping means 30 comprise a single axially acting spring washer of the Belleville washer type, which extends annularly around the axis of the torsion damping assembly. In these embodiments the spring washer 32 opens or diverges to the side facing away from guide washer $12_1$; in other words, the small diameter inner periphery of the spring washer 32 bears against the guide member $12_1$.

According to the invention the means for axially interconnecting the spring washer 32 defining the axially acting resilient clamping means 30 with the associated retaining washer $31_1$ comprise detent means 35.

In the embodiment of FIGS. 1-5, the detent means 35 comprise at least one axially extending resiliently deformable tab 36 fixed to one of the retaining washer $31_1$ and the spring washer 32 and is in engagement at its free end with the other of the retaining washer and the spring washer. As illustrated, and in practice, the resiliently deformable tab 36 is in one-piece construction with the retaining washer $31_1$. The resiliently deformable tab 36 extends through the guide member $12_1$ via a passage 37 formed herein and is in engagement with the outer peripheral edge of the spring washer 32. As shown in the FIGS. 1-5 embodiment the resiliently deformable tab 36 comprises a radially inwardly directed pawl or hooking projection 38 with an oblique chamfer 39.

In practice, a plurality of resilient deformable tabs 36 are provided, which are three in number in the FIGS. 1-5 embodiment, and these resiliently deformable tabs 36 are regularly angularly spaced from one another.

In practice, the retaining washer $31_1$ formed in one-piece with the resiliently deformable tabs 36, is made of plastic material, and it comprises a spacer washer between the hub web 11 and the friction washer means 22. In other words, the retaining washer $31_1$ is in axial contact with both the support washer 23 of the friction washer means 22 and the hub web 11.

The entire retaining washer $31_1$ and its resilient deformable tabs 36 are of one-piece molded plastic construction. Preferably, at the base of each of the tabs 36 there is an opening 40 (see FIGS. 2-5) in registry with the plunger used during molding for forming the pawl or hooking projection 38. In the embodiment illustrated in FIGS. 1-5 each resiliently deformable tab 36 is attached to the retaining washer $31_1$ by only two thin lateral wall portions 41 on the respective sides of the associated opening 40.

In the FIGS. 1-5 embodiment each of the resiliently deformable tabs 36 has radial clearance with the corresponding passage 37 in the guide member 12, for permitting free resilient deformation as well as circumferential clearance to each side thereof. For fixing the retaining washer 31, for rotation with the guide member $12_1$, the retaining washer $31_1$ comprises at least one axial nib 43 which is separate from the resiliently deformable tabs 36 and is received in a cutout 44 of at least circumferentially complementary configuration in the guide member $12_1$. In practice, there are as many dogs or nibs 43 as resiliently deformable tabs 36 and the corresponding cutouts 44 each open into the respective passages 37 through which the resiliently deformable tabs 36 extend. For example, in FIG. 5, the circumferential extent of cutout 44, and therefore nib or dog 43, may be less than that of the corresponding passage 37. Alternatively, as shown in FIG. 6, the circumferential extent of the cutout 44, and therefore the nib or dog 43, is greater than that of the corresponding passage 37.

Thus fixed for rotation with the guide member 12 and coaxial part B the retaining washer $31_1$ which moreover is in contact with the hub web 11, and therefore coaxial part A, is part of the friction means interposed axially between the coaxial parts A and B.

Besides the friction washer means 22 and the retaining or spacer washer $31_1$, the friction means interposed axially between the coaxial parts A and B also comprise on the side of the guide member $12_2$ a spacer washer $31_2$ which is disposed axially between the hub web 11 and the guide member $12_2$ and is in axial contact with the hub web 11. The axially acting spring washer 46 urges the spacer washer $31_2$ against the hub web 11. In the illustrated embodiments of FIGS. 1-7 the spring washer 46 which bears against the guide member $12_2$ through web 16 of the friction disc 15 is a crinkle or undulated washer such as sold under the trademark Onduflex.

The spacer washer $31_2$ which is made of plastic material is fixed for rotation with the guide member $12_2$. For example, as shown, the spacer washer $31_2$ may be formed in one-piece with a sleeve or bearing $47_2$ interposed annularly between the guide member $12_2$ and the hub 10 and fixed for rotation on the guide member $12_2$. The guide member $12_2$ has for this purpose at least one radial tooth at its periphery radially extending into a corresponding notch $49_2$ in such a sleeve or bearing $47_2$.

The torsion damping assembly according to the invention is assembled in the usual manner by axially stacking the various components except for the spring washer 32 and riveting the cross members 13 to the guide members $12_1$, $12_2$. Once this assembly step is completed the spring washer 32 is mounted.

According to the invention the spring washer is advantageously mounted by detenting or snap fitting. The spring washer 32 is inserted by force against the resiliently deformable tabs 36 until it clears the hooking projections or pawls 38 at the free ends of the tabs by radially outwardly deforming the tabs. As will be readily understood the engagement of the spring washer 32 is facilitated by the inwardly facing chamfer 39 formed at the end of each pawl or hooking projection.

In operation, as is known per se, each of the retaining or spacer washers $31_1$, $31_2$ produces contact friction over the range of angular displacement between the coaxial parts A, B and together they are subjected to the action of the spring washer 46.

On the other hand, the friction washer means 22 produces contact friction only insofar as there is rotation relative to the guide member $12_1$, the friction washer means 22 being attached for rotation with coaxial part A by its axial lugs 26 or radial fingers. Thus, when the friction washer means 22 produces friction, it is not only urged by the spring washer 46 but also by the axially acting resilient clamping means 30 defined by spring washer 32. But the axially acting resilient clamping means 30 bias the friction washer means 22 only and therefore the resilient clamping means have no effect on the friction due to the retaining or spacer washers $31_1$, $32_2$. The axially acting resilient clamping means clamps only the friction washer 22 against the guide member $12_1$.

In the embodiment illustrated in FIGS. 7–9, the axially acting resilient clamping means 30 associated with the friction washer 22 comprise a crinkle or undulated washer 50 such as sold under the trademark Onduflex.

Further, in this embodiment instead of each resiliently deformable tab forming a single component, the resiliently deformable tab 36 comprises an integrally formed tab which is bifurcated at least at its free end, and along its entire length as shown, and comprises two fingers 52. The fingers 52 of each bifurcated tab 36 are circumferentially resiliently deformable in opposite directions and both extend through the passage 53 in the spring washer 50. Each of the fingers 52 has a hooking projection or pawl which projects circumferentially outwards for engaging the spring washer 50 against the portion defining the passage 53 therein. In the illustrated embodiment the passage 53 in the spring washer 50 comprises a notch formed between two outwardly projecting radial lugs at its outer periphery.

Finally, in the FIGS. 7–9 embodiment, instead of the dog or nib 43 being located on a circumference of smaller diameter than that on which the resiliently deformable tabs are provided, each of the dogs or nibs 43 on the retaining washer 32 for fixing the latter for rotation with the guide member 12, is disposed along a circumference which is of larger diameter than that on which the resiliently deformable tabs 36 are provided.

Figure 10:
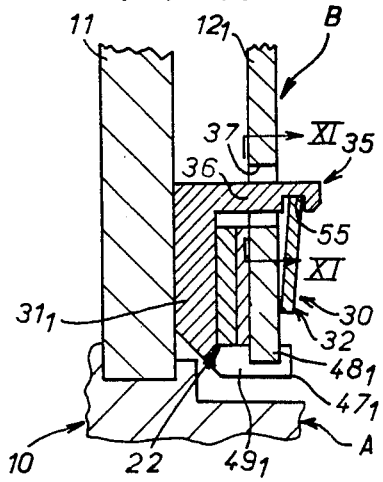
FIG. 10 shows a view corresponding in part to FIG. 2 for yet another embodiment.
Figure 11:
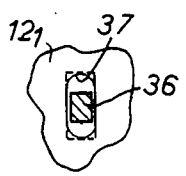
FIG. 11 shows a fragmentary transverse sectional view taken along line XI—XI in FIG. 10.

In the illustrated embodiment of FIGS. 10 and 11, the retaining washer $31_1$ is fixed for rotation with the guide member $12_1$ like the spacer washer $31_2$. To this end the retaining washer $31_1$ has an integral sleeve $47_1$ which defines a bearing and which comprises notches $49_1$ in which radial teeth $48_1$ on the guide member $12_1$ are engaged.

Further, in this embodiment each resiliently deformable tab 36 on the retaining washer $31_1$ has a groove 55 along its inner surface for engagement with the outer edge of the Belleville type spring washer 32 defining the axially acting clamping means 30.

As above, for the radial clearance necessary for this resiliently deformable tab 36 during the mounting of the spring washer 32, the passage 37 in guide member $12_1$ is radially elongated on each side of each tab to form a slot which is semicircular at its ends, as shown in solid lines in FIG. 11, or rectangular, as shown in broken lines in FIG. 11.

Figure 12:
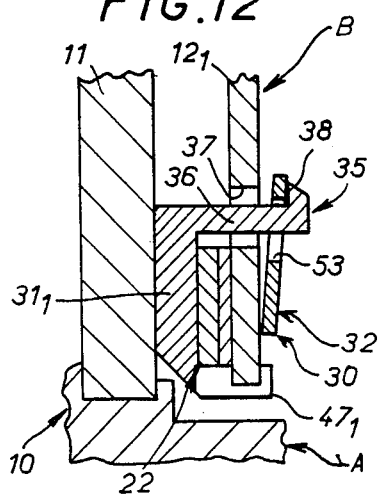
FIG. 12 shows a view similar to that of FIG. 10 for still another embodiment.

According to the embodiment illustrated in FIG. 12, each resiliently deformable tab 36 is radially inwardly resiliently deformable and extends through a passage 53 in the spring washer 32. A radially outwardly directed hooking projection 38 is provided on each tab 36 and engages the corresponding portion of the spring washer 32 outwardly of the passage 53.

Figure 13:
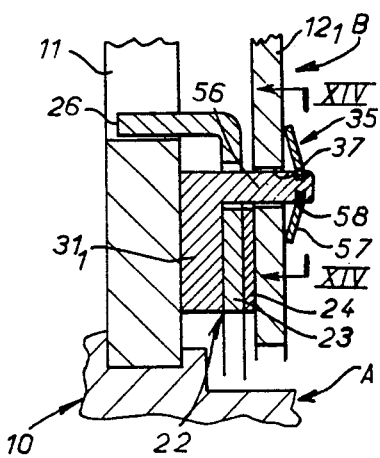
FIGS. 13 and 14 are views similar to those of FIGS. 10 and 11 for another embodiment, FIG. 14 having twice the scale of FIG. 13.
Figure 14:
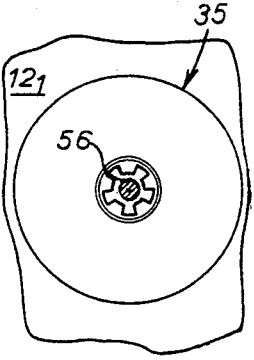

In the FIGS. 13, 14 embodiment the detent means 35 according to the invention comprise at least one axially extending tab 56 integral with the retaining washer $31_1$ which extends through a passage 37 in guide member $12_1$. The associated axially acting resilient clamping means 30 comprise axially acting springs 57 which are received on the ends of the respective tabs 56. In practice, the springs 57 are cup springs with a tabbed inner periphery detented in the groove 58 in the corresponding tabs 56, the outer periphery of the cup springs 57 bearing against the guide member $12_1$.

In the embodiment of FIGS. 13 and 14 the cross section of the tabs 56, which are not resiliently deformable, is circular and complementary to that of passages 37 by which the tabs 56 extend through the guide member $12_1$. It follows that the tabs 56 define the means for fixing the retaining washer $31_1$ for rotation with the guide member $12_1$.

Figure 15:
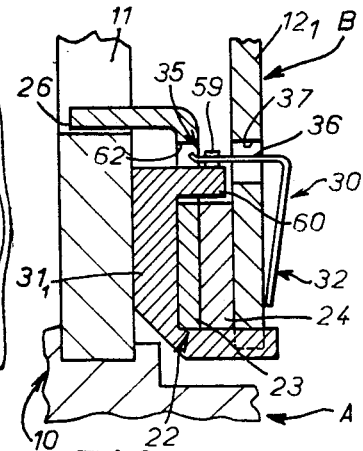
FIG. 15 is a view similar to that of FIG. 10 for another embodiment.

In the embodiment illustrated in FIG. 15, the axially acting resilient clamping means 30 comprise a spring clip comprising a Belleville type spring washer 32 having radially resiliently deformable tabs 36 in one-piece therewith. Each of the resiliently deformable tabs 36 extends through a passage 37 in the guide member $12_1$. The free end of each tab 36 comprises a cutout by which the tab is detented on a teat 59 radially outwardly projecting from an arm 60 integral with the retaining washer $31_1$, for example, integrally molded therewith. The arm extends axially toward the guide member $12_1$ and extends through a passage 62 in the back-up washer 23 of the friction washer means 22.

In the preceding embodiments the friction washer means 22 are associated with the guide member $12_1$. Alternatively, as shown in FIG. 16, the friction washer means 22 may be associated with the other guide member $12_2$.

Figure 16:
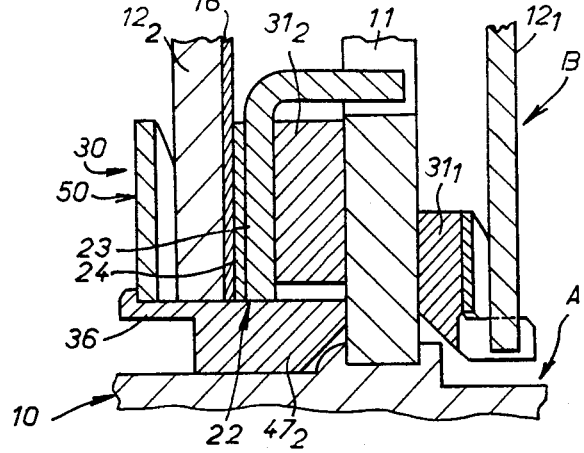

In FIG. 16, the axially acting resilient clamping means 30 associated with the friction washer means 22 comprise a crinkle or undulated washer 50 and a spacer washer $31_2$ defines the corresponding retaining washer.

Figure 17:
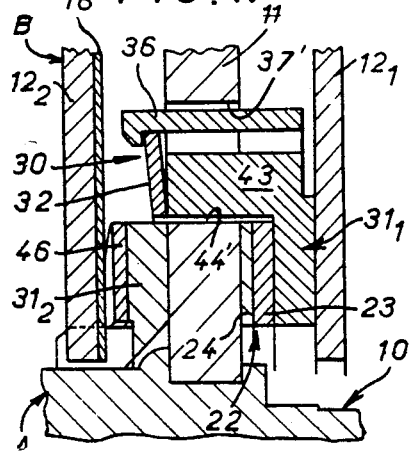
FIGS. 16 and 17 are views similar to that of FIG. 2, each for a further modified embodiment.

In the preceding embodiments the load bearing component in contact with the friction washer means 22 comprised a guide member $12_1$ or $12_2$. Alternatively, in the FIG. 17 the so-called load bearing component comprises the hub web 11. In this embodiment the spring washer 32 defining the axially acting resilient clamping means is disposed on the side of the hub web 11 remote from the friction washer means 22 and therefore, in practice, it is disposed inside the space defined between the two guide members $12_1$, $12_2$. In conjunction therewith the resiliently deformable tabs 36 on the retaining washer $31_1$ extend through the passages 37' in the hub web 11 for engagement with the spring washer 32. Likewise the cutouts 44' in the hub web 11 receive the dogs 42 on the retaining washer. The other features are as described with respect to the preceding embodiments.

The present invention is not intended to be limited to the various embodiments described and illustrated herein but admits of all modifications and alternatives and combinations of the features of various embodiments understood to those skilled in the art without departing from the spirit and scope of the invention.

What is claimed is:

1. A torsion damping assembly for an automotive friction clutch, said torsion damping assembly comprising at least two coaxial parts mounted for relative angular displacement within a predetermined range, resilient means interposed chordally between said coaxial parts, a friction washer means arranged in axial contact with a bearing component formed as part of one of said coaxial parts, axially acting resilient clamping means bearing against said bearing component located on one side thereof remote from said friction washer and urging said friction washer means toward said bearing component, snap-type detent means for axially interconnecting said resilient clamping means with a retaining washer located on the other side of said bearing component.

2. The torsion damping assembly of claim 1, wherein one of said coaxial parts comprises a transverse web and the other of said coaxial parts comprises at least one annular guide member, said bearing component being defined by said guide member.

3. The torsion damping assembly of claim 2, wherein said retaining washer is formed of plastic material and comprises a spacer washer between said web and one of said guide members and said friction washer means.

4. The torsion damping assembly of claim 1, wherein one of said coaxial parts comprises a transverse web and the other of said coaxial parts comprises at least one annular guide member, said bearing component being defined by said web.

5. The torsion damping assembly of claim 1, wherein said detent means comprise at least one axial tab fixed to said retaining washer and extending through a passage in said bearing component, said resilient clamping means comprising a cup spring at the free end of said tab.

6. The torsion damping assembly of claim 5, wherein said resiliently deformable tab extends through a passage in said bearing component, said tab defining means for connecting said retaining washer for rotation, said tab being circumferentially complementary to said passage through said bearing component.

7. The torsion damping assembly of claim 5, wherein said resiliently deformable tab extends through a passage in said bearing component, said retaining washer having at least one dog or nib engaged in a circumferential cutout in said bearing component.

8. The torsion damping assembly of claim 7, wherein said retaining washer is formed of plastic material and comprises a spacer member between said web and said friction washer means, said cutout being formed in continuity with said passage for said tab.

9. The torsion damping assembly of claim 1, wherein said axially acting resilient clamping means comprises a spring washer bearing along its inner peripheral edge against said bearing component, and said snap-type detent means is located adjacent an outer periphery of said spring washer.

10. A torsion damping assembly for an automotive friction clutch, said torsion damping assembly comprising at least two coaxial parts mounted for relative angular displacement within a predetermined range, resilient means interposed chordally between said coaxial parts, a friction washer means arranged in axial contact with a bearing component formed by one of said coaxial parts, axially acting resilient clamping means bearing against said bearing component located on one side thereof remote from said friction washer and urging said friction washer means toward said bearing component, detent means for axially interconnecting said resilient clamping means with a retaining washer located on the other side of said bearing component, said axially acting resilient clamping means comprising a spring washer arranged annularly of said torsion damping assembly, and said detent means comprising at least one resiliently deformable axial tab fixed to a selected one of said retaining washer and said spring washer and in engagement at its outer end with the nonselected one of said retaining washer and said spring washer.

11. The torsion damping assembly of claim 10, wherein said resiliently deformable tab is formed in one-piece with said spring washer.

12. The torsion damping assembly of claim 10, wherein said resiliently deformable tab extends through a passage in said bearing component.

13. The torsion damping assembly of claim 10, wherein said resiliently deformable tab extends around an inner periphery of said bearing component.

14. The torsion damping assembly of claim 10, wherein said resiliently deformable tab extends through a passage in said bearing component, said tab defining means connecting said retaining washer for rotation, said tab being circumferentially complementary to said passage through said bearing component.

15. The torsion damping assembly of claim 10, wherein said resiliently deformable tab extends through a passage in said bearing component, said retaining washer having at least one dog or nib engaged in a circumferential cutout in said bearing component.

16. The torsion damping assembly of claim 15, wherein said retaining washer is formed of plastic material and comprises a spacer member between said web and said friction washer means, said cutout being formed in continuity with said passage for said tab.

17. The torsion damping assembly of claim 10, wherein said resiliently deformable tab is in one-piece construction with said retaining washer.

18. The torsion damping assembly of claim 17, wherein said resiliently deformable tab is in engagement with one of the peripheral margins of said spring washer.

19. The torsion damping assembly of claim 17, wherein said resiliently deformable tab extends through a passage in said spring washer and engages an edge portion of said spring washer defining said passage.

20. The torsion damping assembly of claim 17, wherein said resiliently deformable tab is radially resiliently deformable.

21. The torsion damping assembly of claim 17, wherein said resiliently deformable tab is bifurcated into two fingers, said fingers being circumferentially resiliently deformable in opposite directions to each other.

* * * * *